Patented Dec. 30, 1947

2,433,680

UNITED STATES PATENT OFFICE 2,433,680

METHOD OF MAKING ADHESIVE FILM

Ove Emil Backman, Tammerfors, Finland

No Drawing. Application May 19, 1944,
Serial No. 536,421

1 Claim. (Cl. 117—122)

My invention relates to a method of making a dry adhesive film from an urea-aldehyde condensation product and to a film made by said method.

The object of my invention is to provide an adhesive film from an urea-aldehyde condensation product combining good adhesive qualities with a maximum of stability under storage, hardening rapidity and freedom from hygroscopicity.

A further object of my invention is to give the laminated material obtained by using the adhesive film prepared in accordance with my invention maximum water resistance and freedom from discoloration.

A still further object of my invention is to modify the qualities of the adhesive film as to its hygroscopicity, pliability, flow properties and tackiness by adding to the condensation products certain substances which eventually react with the said condensation products.

In accordance with my invention, I impregnate a porous carrier, for example, a sheet of paper, a textile fabric or a felted material, with a urea-aldehyde condensation product, to which I beforehand have added catalysts and at least two inactivating compounds of basic nature, which inactivating compounds are adapted at room temperature to inactivate the catalyst but to activate them when exposed to heating and pressure. In order to assure a proper reaction of the impregnating medium, I choose the proportion between the catalysts and the inactivating compounds so that a pH 4.5–7 results in the impregnating medium.

As catalysts I use acid reacting compounds, such as acids, for example, acetic, oxalic, phthalic, and benzoic acids, acid reacting salts, as ammonium sulphate, ammonium phosphate, salts of chloric acid, perchloric acid and chloracetic acid, further esters of organic and inorganic acids, for instance diethyl ester of oxalic acid. As inactivating compounds I have found suitable basic compounds, volatile as well as non volatile ones, for example, ammonia, hexamethylene-tetramine, alkaline earth hydroxides, alkali hydroxides, triethanolamine, derivatives of hydrazine or hydroxylamine. Depending on the nature and quality of the condensation product and the catalysts used, it must be tried out by experiment in every case to determine the proper proportion between the inactivating compounds themselves, the catalysts and their concentration in the impregnating solution in order to obtain optimal properties in respect to stability on the storage, hygroscopicity, hardening rapidity and flow properties in the film and in respect to water resistance and freedom from discoloration in the laminated material.

As one preferable form of carrying out my invention I condense 1800 parts by weight of formaldehyde of 35–40% by volume and 650 parts by weight of urea at a pH value of 5.0 under pressure and at a temperature of 100° C. during three hours, which product I neutralize with a volatile base, for example ammonia. To 1000 parts by weight (grams) of this product I add 25 grams of urea and further a water solution of 7.5 grams of an ammonium salt of an acid, and 2.5 grams of alkali hydroxide and 25 cc. of concentrated ammonia. With the product obtained, I impregnate a porous carrier, preferably a sheet of paper, and finally I dry the impregnated carrier at temperatures between 50 and 70° C. so that the water content is reduced below 5%. I wish to be understood that I do not desire to be limited to the details of the example described, for obvious modifications will occur to a person skilled in the art.

The proportions of the binder can be modified by adding, with the condensation products used, suitable substances which vary the flow properties, hygroscopicity, pliability and tackiness of the finished film. Such substances are for instance urea, thiourea, melamine, urethane, phenol, resorcinol, cyanamide and further condensation products of them with aldehydes.

The film according to my invention is obtained by impregnating, for instance dipping into or brushing, the carrier, for example, porous paper, with the impregnating solution prepared in the aforesaid manner, drying the impregnated carrier at temperatures between room temperature and 80° C., preferably 60° C., cutting the dry film to suitable size and shape or rolling up the same, whereupon the film is packed and ready for storage and transport.

Sheets of the film are alternatively interposed with sheet material of, for example, veneer, paper or textile fabric, and placed in a hot press working with a minimum pressure of 15 kg./square cm., and left in the press for a suitable time, depending on the thickness of the laminated material, at temperatures between 90 and 140° C., preferably 110° C.

Obviously, my method of making a dry adhesive film from urea-aldehyde condensation products and also the film made following my method as well as the laminated material obtained by using the said film are susceptible of modifications not specifically set forth, and, consequently, no limitations are to be imposed upon my invention that are not set forth in the claim.

I claim as my invention:

The method of making a dry adhesive film from a urea-formaldehyde condensation product, which comprises impregnating a porous carrier with an admixture of (a) the product of the condensation of 1800 parts by weight of formaldehyde of 35–40% by vol. and 650 parts by weight of urea at a pH of 5.0 under pressure and at a temperature of 100° C. for three hours, said condensation product having been neutralized with ammonia, and (b) 25 parts by weight of urea, a water solution of 7.5 parts by weight of an acid-reacting ammonium salt of an inorganic acid, 2.5 parts by weight of alkali hydroxide, and 25 parts by volume of concentrated ammonia, and drying the impregnated carrier at a temperature between 50 and 70° C. so that the water content is reduced below 5% the "parts by weight" in the foregoing bearing the same relation to "parts by volume" as do grams to cubic centimeters.

OVE EMIL BACKMAN.

REFERENCES CITED

The following references are of record in the file of this patent:

UNITED STATES PATENTS

| Number | Name | Date |
|---|---|---|
| 1,460,606 | Ripper | July 3, 1923 |
| 2,059,609 | Rossiter et al. | Nov. 3, 1936 |
| 2,106,850 | McCulloch | Feb. 1, 1938 |
| 2,187,383 | Ludwig | Jan. 16, 1940 |
| 2,208,290 | Glycofrides | July 16, 1940 |
| 2,277,941 | Almy | Mar. 31, 1942 |
| 2,300,208 | D'Aleio | Oct. 27, 1942 |
| 2,306,057 | Hayward | Dec. 22, 1942 |

FOREIGN PATENTS

| Number | Country | Date |
|---|---|---|
| 351,093 | Great Britain | 1931 |